United States Patent [19]
Enstone et al.

[11] Patent Number: 5,822,419
[45] Date of Patent: Oct. 13, 1998

[54] TELECOMMUNICATIONS SERVICE INTERACTIONS

[75] Inventors: Colin Arthur George Enstone, Wembley; Charles Henry Rubie Lane, Watford; John Anthony Moulton, Coventry, all of United Kingdom

[73] Assignee: GPT Limited, United Kingdom

[21] Appl. No.: 594,524

[22] Filed: Jan. 31, 1996

[30] Foreign Application Priority Data

Feb. 3, 1995 [GB] United Kingdom ............... 9502182

[51] Int. Cl.⁶ ........................................ H04M 3/42
[52] U.S. Cl. .................. 379/207; 379/220; 379/201
[58] Field of Search ................... 379/220, 221, 379/201, 207

[56] References Cited

U.S. PATENT DOCUMENTS

| | | | |
|---|---|---|---|
| 5,337,351 | 8/1994 | Manabe et al. | 379/201 |
| 5,404,396 | 4/1995 | Brennan | 379/207 |
| 5,448,631 | 9/1995 | Cain | 379/207 |
| 5,526,415 | 6/1996 | Wakamoto | 379/207 |

OTHER PUBLICATIONS

Telephone Engineer & Management Entilted: "'AIN 101': Still Don't Understand AIN?. . . " Nov. 91, pp. 63.
Telecommunications Journal (International Edition) Entitled: Intelligent Networks—The Key to Advanced Telephony Services, Dec. 1995, vol. 29, No. 12, pp. 55–61.

*Primary Examiner*—Ahmad F. Matar
*Attorney, Agent, or Firm*—Kirschstein, et al

[57] ABSTRACT

A basic call in a telecommunications network provides a transmission path between two users. Additional functionality is provided by a set of services, wherein, if a number of services is invoked during the same call, it is important that the services do not interact adversely with one another. For detecting service interactions, a service abstract is produced based on a Basic Call State Model and a data processing sequence performed by basic call state processing and by the services in respect of a global data item.

5 Claims, 9 Drawing Sheets

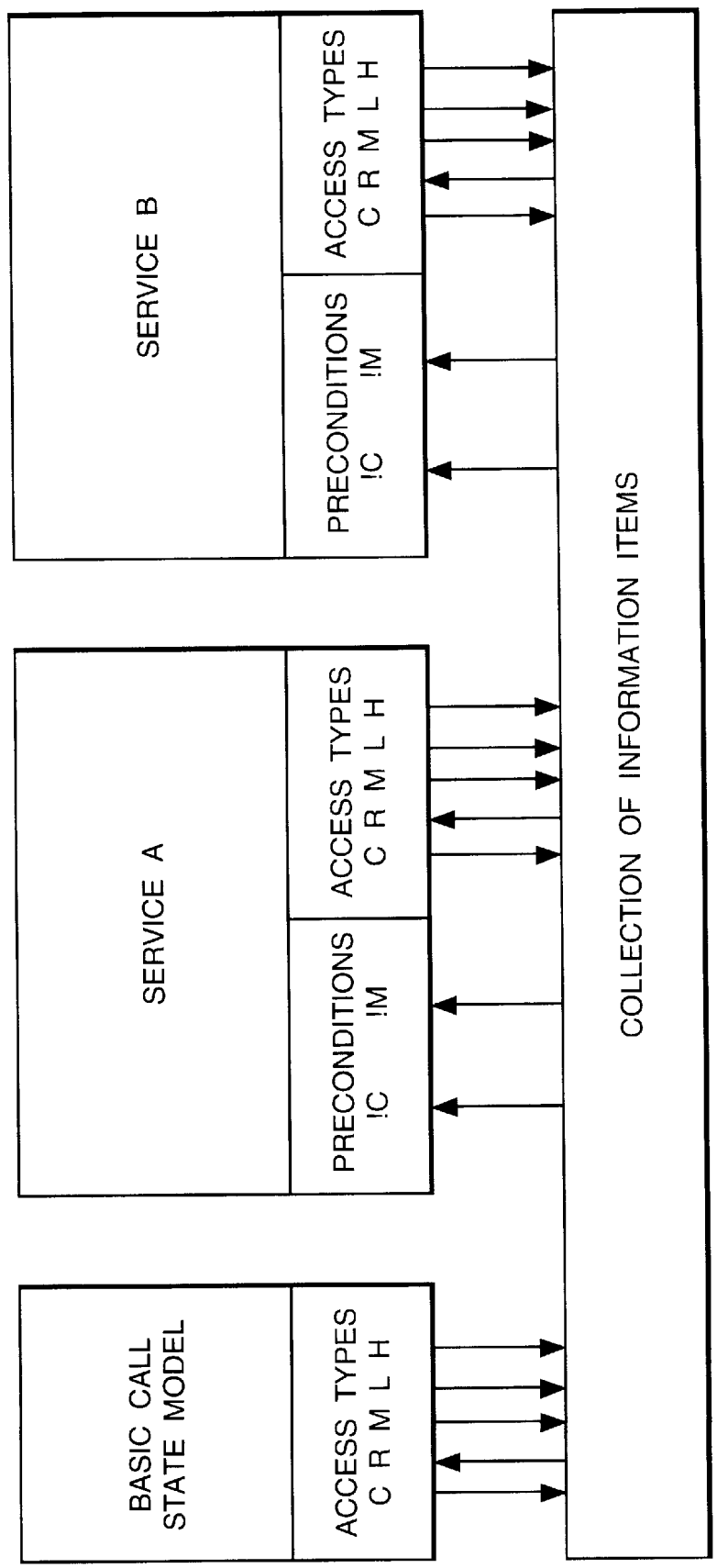

Fig.2.

SERVICE ABSTRACT

SERVICE IDENTIFIER:  
SERVICE NAME:  
BCSM TYPE: Q.1214 CS-N  
START DP:  
POSITION NUMBER:  
END DP(S):  
CONFLICT DP(S): * NOT SET *

READ: CALLING PARTY NUMBER  
READ: CALLED PARTY NUMBER

ADD | EDIT | DELETE

LOAD  SAVE  CLEAR  QUIT

Fig.3.

| ACCOUNT CODE |
| AUTOMATIC DIALLED NUMBER |
| CALL WAITING NUMBER |
| CALLED PARTY NUMBER |
| CALLING PARTY NUMBER |
| PIN NUMBER |
| NEW INFORMATION ITEM |

ADD ENTRY

NUMBER IN LIST:  
INFORMATION ITEM:  
PRE/ACC:

ACCEPT | CANCEL | QUIT

| CREATE |
| READ |
| MODIFY |
| LOCK |
| HIDE |
| CONSUME |
| NOT CREATED |
| NOT MODIFIED |

Fig.8.

```
EXCLUSION RULES

CALLING PARTY NUMBER: LOCK FOLLOWED BY
MODIFY

[ADD]  [EDIT]  [DELETE]  [QUIT]
```

Fig.9.

```
ADD EXCLUSION RULE

INFORMATION ITEM:            [          ]
ACCESS TYPE FOR SERVICE 1:   [          ]
ACCESS TYPE FOR SERVICE 2:   [          ]

[ACCEPT]   [CLEAR]   [QUIT]
```

Fig. 10.

| INFORMATION ITEM | SERVICE | | | | |
|---|---|---|---|---|---|
| | PRE-CONDITIONS | ACCESS TYPES | | | |
| ITEM 1 | | | R | L | |
| ITEM 2 | | | | | |
| ITEM 3 | | | | | H |
| ITEM 4 | | !M | R | | |
| ITEM 5 | !C | | C | L | |
| ITEM 6 | | !M | | M | |
| ... | | | | | |

Fig. 11.

| INFORMATION ITEM | PREVIOUS ACCESS TYPES | | | | |
|---|---|---|---|---|---|
| ITEM 1 | C | R | | | |
| ITEM 2 | C | | | | H |
| ITEM 3 | C | R | M | | |
| ITEM 4 | | | | | |
| ITEM 5 | C | | | L | |
| ITEM 6 | C | | M | | |
| ... | | | | | |

Fig. 12.

| INFORM. ITEM | PREVIOUS ACCESS TYPES | | | | SERVICE | | | | |
|---|---|---|---|---|---|---|---|---|---|
| | | | | | PRE-CONDITIONS | ACCESS TYPES | | | |
| ITEM 1 | C | | | | !C | | | | |
| ITEM 2 | C | M | | | | !M | | | |
| ITEM 3 | | | | | | R | | | |
| ITEM 4 | | | | | | | M | | |
| ITEM 5 | | | | | | | | L | |
| ITEM 6 | | | | | | | | | H |
| ITEM 7 | C | | | | C | | | | |
| ITEM 8 | C | L | | | | | M | | |
| ITEM 9 | C | | H | | | R | | | |
| ITEM 10 | C | | H | | | | M | | |
| ITEM 11 | C | | H | | | | | L | |

Fig.13.

| INFORMATION ITEM |
|---|
| CALLED PARTY NUMBER<br>TRANSLATED NUMBER<br>CALLING PARTY NUMBER<br>AUTOMATIC DIALLED NUMBER<br>CALL WAITING FLAG |
| PIN |
| ACCOUNT CODE<br>CREDIT CARD NUMBER<br>CHARGE CALLED PARTY<br>CHARGE BOTH PARTIES |
| BRIDGE RESOURCE<br>DIVERSION COUNT |

Fig.14.

| | CALLED PARTY NUMBER | | CALLING PARTY NUMBER | | ACCOUNT CODE | | PIN | | AUTOMATIC DIALLED NUMBER | |
|---|---|---|---|---|---|---|---|---|---|---|
| | PRE | ACC | PRE | ACC | PRE | ACC | PRE | ACC | PRE | ACC |
| AAB | | | | | | C | | C | | |
| ABD | !M | M | | | | | | | | |
| AC | | | | | | | | | | |
| ACB_1 | | | !M | R | | | | | | C |
| ACB_2 | | | | | | | | | | R |
| ACC | | | | | | C | | C | | |
| ACNI | | | | | | | | | | |
| ADAC | | | !M | R | | | | | | |
| AUTC | | | | | | | | C | | |
| AUTZ | | | | | | | | C | | |
| BN | | | | | | | | | | C |
| CBWA_1 | | R | | | | | | | | C |
| CBWA_2 | | | | | | | | | | R |
| CBWF_1 | | R | | | | | | | | C |
| CBWF_2 | | | | | | | | | | R |
| CCC | | | | | | C | | C | | |
| CCI | | | | R | | | | | | |
| CD | | M | | | | | | | | |
| CFU | | M | | | | | | | | |
| CLIP | | | !M | R | | | | | | |
| CLIR | | | | H | | | | | | |
| CNA | | R | | | | | | | | |
| COC | | | | | | | | | | |
| CON | | | | | | | | | | |
| CPM | | | | | | | | | | |
| CRD | | M | | | | | | | | |
| CRG | | R | | | | | | | | |
| CW_1 | | | | | | | | | | |
| CW_2 | | | | | | | | | | |
| CW_3 | | R | | R | | | | | | |
| DCR | | M | !M | R | | | | C | | |
| DUP | | | !M | R | | | | | | |
| FDC | | | | | | | | | | C |
| FMD | | M | | | | | | | | |
| FPH | | | | | | | | | | |
| GAP | | | | | | | | | | |
| LIM | | M | | | | | | | | |
| LNS/D_1 | | | | | | | | | | C |
| LNS/D_2 | | | | | | | | | | R |
| MAS | | M | !M | R | | | | | | |
| MCI | | R | !M | R | | | | | | |
| MMC | !M | | | | | | | | | |
| MSN | | | | | | | | | | |
| NSN | | M | | | | | | | | |
| OC | | | !M | R | | | | | | |
| OCNI | | | | | | | | | | |
| OCS_ORIG | | L | | | | | | C | | |
| OCS_TERM | | | !M | R | | | | | | |
| ODR | | M | !M | R | | | | | | |
| OFA | | M | | | | | | C | | |
| OFC | | M | | | | | | | | |
| OUP | !M | L | | | | | | | | !C |
| PNS | | M | | | | | | | | |
| PRM | | M | | | | | | | | |
| QUE | | | | | | | | | | |
| REVC | | | | | | | | | | |
| SCF_BUSY | | M | | | | | | | | |
| SCF_NO_ANS | | M | | | | | | | | |
| SEC | | | | | | | | C | | |
| SPL | | | | | | | | | | |
| TCS | | | !M | R | | | | | | |
| TDR | | M | | | | | | | | |
| TKCP | !M | L | | | | | | C | | |
| TRA | | M | | | | | | | | !C |
| TSO | | | | | | | | | | |
| UDR | | R | | | | | | | | |
| VOT | !M | | | | | | | | | |

Fig.15.

| | |
|---|---|
| AAB | AUTOMATIC ALTERNATIVE BILLING |
| ABD | ABBREVIATED DIALLING |
| AC | ANSWER CALL |
| ACB | AUTOMATIC CALLBACK AFTER BUSY |
| ACC | ACCOUNT CARD CALLING |
| ACNI | AUTOMATIC CHANGE No. INTERCEPTION |
| ADAC | ADVICE OF DURATION & CHARGE |
| AUTC | AUTHENTICATION |
| AUTZ | AUTHORISATION CODE |
| BN | BYPASS NUMBER |
| CBWA | CALL BACK WHEN AVAILABLE |
| CBWF | CALL BACK WHEN FREE |
| CCC | CREDIT CARD CALLING |
| CCI | CALL CREDIT INDICATION |
| CD | CALL DISTRIBUTION |
| CFU | CALL FORWARD UNCONDITIONAL |
| CLIP | CLI PRESENTATION |
| CLIR | CLI RESTRICTION |
| CNA | CHARGE NUMBER ANNOUNCEMENT |
| COC | CONSULTATION CALLING |
| CON | CONFERENCE ADD ON |
| CPM | CUSTOMER PROFLIE MANAGEMENT |
| CRD | CALL REROUTING DISTRIBUTION (BUSY) |
| CRG | CUSTOMISED RINGING |
| CW | CALL WAITING |
| DCR | DESTINATION CALL ROUTING |
| DUP | DESTINATION USER PROMPTING |
| FDC | FIXED DESTINATION CALL |
| FMD | FOLLOW ME DIVERSION |
| FPH | FREE PHONE |
| GAP | CALL GAPPING |
| LIM | CALL LIMITER |
| LNS/D | LAST NUMBER SAVED/DIALLED |
| MAS | MASS CALLING |
| MCI | MALICIOUS CALL IDENTIFICATION |
| MMC | MEET ME CONFERENCE |
| MSN | MULTIPLE SUBSCRIBER NUMBERS |
| NSN | NIGHT SERVICES |
| OC | ORDER CALL |
| OCNI | OPERATOR CHANGED No. INTERCEPTION |
| OCS_ORIG | ORIGINATING CALL SCREENING AT ORIGIN |
| OCS_TERM | ORIGINATING CALL SCREENING AT TERMINATION |
| ODR | ORIGIN DEPARTMENT ROUTING |
| OFA | OFF NET ACCESS |
| OFC | OFF NET CALLING |
| OUP | ORIGINATING USER PROMPTING |
| PNS | PERSONAL NUMBER SERVICE |
| PRM | PREMIUM RATE |
| QUE | CALL QUEUING |
| REVC | REVERSE CHARGES |
| SCF_BUSY | SELECTIVE CALL FORWARD (BUSY) |
| SCF_NO_ANS | SELECTIVE CALL FORWARD (NO ANSWER) |
| SEC | SECURITY SCREENING |
| SPL | SPLIT CHARGING |
| TCS | TERMINATING CALL SCREENING |
| TDR | TIME DEPENDENT ROUTING |
| TKCP | TERMINATION KEY CODE PROTECTION |
| TRA | CALL TRANSFER |
| TSO | TELEPHONE SERVICE OBSERVATION |
| UDR | USER DEFINED ROUTING |
| VOT | TELEVOTING |

# TELECOMMUNICATIONS SERVICE INTERACTIONS

FIELD OF THE INVENTION

Background of the Invention

A basic call in a telecommunications network provides a transmission path between two users. Additional functionality is provided by a set of services (also known as features). If a number of services are invoked during the same call, then it is important that they do not interact adversely with one another. A system for detecting possible service interactions during service specification or creation is described.

SUMMARY OF THE INVENTION

According to the present invention there is provided a method of detecting Service interactions in a telecommunications system comprising producing a service abstract based on a Basic Call State Model (BCSM) and data processing performed by the basic call processing and by the services in respect of a data item.

The present invention will now be described by way of example, with reference to the accompanying Figures, in which:

BRIEF DESCRIPTION OF THE DRAWINGS

FIG. 1 shows a schematic representation of a model used for finding Precondition and Access Type conflicts;

FIG. 2 shows the main window for the servab program;

FIG. 3 shows the Add window for the servab program;

FIG. 8 shows the Exclusion Rules window;

FIG. 9 shows the Add Exclusion Rule window;

FIG. 10 shows the Service Access Table;

FIG. 11 shows the Previous Access Table;

FIG. 12 shows the Precondition and Access Type Conflicts;

FIG. 13 shows the Candidate Information Items;

FIG. 14 shows an Example Set of Preconditions and Access Types; and

FIG. 15 shows a List of Service Abbreviations.

DETAILED DESCRIPTION OF THE INVENTION

Figure 4:
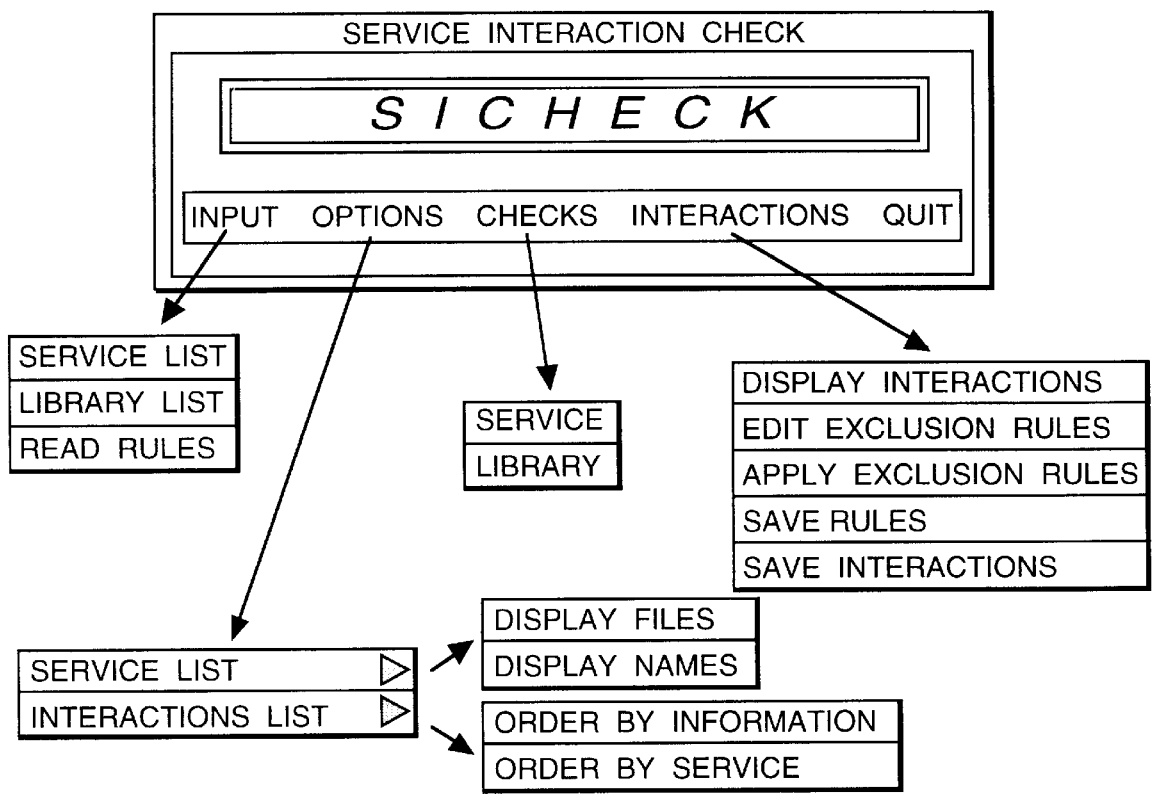
FIG. 4 shows the main window for the sicheck program.

A "service abstract", which encapsulates the behaviour of a service and is based on two models is prepared.

The Basic Call State Model (BCSM) gives a high level description of the Call Processing Subsystem. Additional service processing is performed by leaving the BCSM at a start detection point (DP) and when processing is complete rejoining the BCSM at an end detection point.

The second model relates to the data processing performed by basic call processing and by the services. To support this model a set of global data items are identified.

The service abstract contains the start DP, the end DP(s) and the position number, which is used to prioritise services having the same start DP. In addition, the preconditions and access types are given for each data item. A precondition requires that an item must not have been created or modified. Access types (create, read, modify, lock, hide, consume) specify the operations that are performed on a data item. The service abstract does not reveal implementation details and so is more likely to be disclosed by a third party.

1. Detection Point Control Conflicts. These occur when the range of a service between start and end detection points masks the start detection point of another service.
2. Precondition and Access Type Conflicts. A precondition conflict occurs when a service has a precondition that a data item must not have been created (modified) and the item has been previously created (modified). An access type conflict occurs when a data item is accessed using incompatible access types.
3. Contention for Limited Resources. This occurs when several services require exclusive use of the same resource.

1. Introduction

The article "A Practical Approach to Service Interactions", E. Kuisch, R. Janmaat, H. Mulder and I. Keesmaat, IEEE Communications Magazine pp 24–31 August 1993 introduced the notion of specifying the post- and preconditions of a service. It was pointed out that when service A is followed by service B, there is a service interaction if the postconditions of service A conflict with the preconditions of service B. Only interactions resulting from precondition and access type conflicts are considered here.

A service performs operations on data items using the following access types: create; read; modify; lock; hide. Typical data items are: called party number; calling party number; account code etc. A list of all the accesses replaces the service postconditions. Two types of service precondition are used: item not previously created; item not previously modified. Other preconditions are implied but are not explicitly stated, e.g. an item must not be modified if it is locked. Service interactions are found by comparing the service preconditions and access types with previous service accesses. It is assumed that the services are executed in sequence.

It is possible to find precondition and access type conflicts during the specification phase of the service life cycle and before the data items are allocated to a physical location. At a later stage message sets are specified. Each message is defined as an information flow and conveys a number of information elements. Data items and information elements are different entities, although in many cases there is a close mapping between them. Therefore a study of information flows is useful for identifying candidate data items.

2. Model used for Finding Service Precondition and Access Type Conflicts

The determination of precondition and access type conflicts is based on a conceptual model, which is illustrated schematically in FIG. 1. The model contains a collection of data items, which are either created by the Basic Call State Model (BCSM) or by a service. The items created by the BCSM will depend on the exit detection point. Operations are performed on a data item using a set of access types. Following standard practice the following access types are used: Create (C); Read (R); and Modify (M). It has been found necessary to add two additional access types: Lock (L) and Hide (H). Lock prevents a data item from being modified and Hide from it being read, modified or locked. In addition, preconditions may be attached to a service, which require that a particular data item must not previously have been created (!C) or must not previously have been modified (!M). It is assumed that the BCSM operates first of all, followed by each service in sequence. The return to the BCSM may have preconditions (not shown in FIG. 1).

This model has the advantage that it is not necessary to specify message sets or information flows.

3. Service Access and Previous Access Tables

In order to find precondition and access type conflicts, it is necessary to specify a service access table for each individual service. This table specifies the combined service preconditions and access types for all data items. A simple example is given in FIG. 10. It will be noted that more than one access type may apply to the same data item.

An additional table is required to record all the accesses made by the sequence of previous services (including the Basic Call State Model). This table is referred to as the previous access table. A simple example is given in FIG. 11.

Conflicts are found by comparing the service access table with the previous access table. FIG. 12 exhibits all the possible conflict types. Rows 1 and 2 exhibit precondition conflicts, because the item has been previously created or modified respectively. Rows 3 to 6 attempt to access an item which has not been created previously or by the current service. Row 7 gives rise to a multiple create conflict. A locked item should not have modify access (row 8) and a hidden item should not have read, modify or lock access (rows 9 to 11).

4. Algorithm Used for Finding Service Precondition and Access Type Conflicts

Considering two services A and B, which operate in sequence (FIG. 1), the first step is to test for conflicts between service A and the Basic Call State Model. Any initial conflicts are found by comparing the service A access table with the previous access table, which in this case is the BCSM access table. The previous access table is updated to include any additional accesses made by service A. Any further conflicts are found by comparing the service B access table with the updated previous access table. This procedure can be repeated for an indefinite number of additional services resulting in the following algorithm.

```
Initialise the previous access table with the BCSM table;
while services remain to be tested
begin
    read the name of the next service to be tested;
    extract the service access table from the service abstract;
    test for conflicts by comparing the service access table with the
    previous access table;
    update the previous access table;
end.
```

Suppose service A followed by service B gives a set of service interactions. Inserting additional services in the sequence between services A and B will not affect the original set of interactions. This follows because the previous access table includes all the previous accesses and not just those of the immediately preceding service. Thus when testing a new service, it is only necessary to consider its interactions with one service at a time.

5. Examples of Service Interactions Resulting from Precondition and Access Type Conflicts Examples of service interactions resulting from different types of conflict are given below. Words in italics refer to data items. The prefix ! (e.g. !C and !M) implies NOT.

5.1. Automatic Call Back (ACB) and Terminating Key Code Protection (TKCP) (C–!C conflict)

The ACB service allows the called party to automatically call back the calling party of the last call directed to the called party. This involves the creation of automatic dialled number. The TKCP service enables a subscriber to protect his line by a user defined key, i.e. PIN code. Callers are required to enter this key. In order to do this the destination must be known to the caller, which results in a precondition that automatic dialled number must not have been created.

5.2. Call Forwarding Unconditional (CFU) and Terminating Key Code Protection (M–!M conflict)

The CFU service redirects the call and thus modifies the called party number. The TKCP service requires the caller to know the destination, which results in a precondition that the called party number must not have been modified.

5.3. Security Screening and Authorisation Code (C—C conflict)

Both services require the caller to enter a Personal Identification Number and hence there is a multiple create of PIN.

5.4. Originating Call Screening (OCS) and Call Forwarding Unconditional (CFU) (L–M conflict)

The OCS service enables a subscriber to specify that outgoing calls can either be restricted or allowed according to a screening list. The called party number is locked to prevent future redirection, which could circumvent the screening process. However the CFU service modifies the called party number.

5.5. Calling Line Identification Restriction (CLIR) and Calling Line Identification Presentation (CLIP) (H–R conflict)

CLIR is a service offered to the calling party to restrict presentation of the calling party's number to the called party. CLIP is a service offered to the called party which provides the calling party's number of the called party. CLIR and CLIP hide and read the calling party number respectively.

5.6. Standard Interaction Classes

It is anticipated that these examples will form the basis for a number of well understood interaction classes. Many services modify the called party number, either by translation or by diversion. Other services have a precondition that the called party number must not be modified. Therefore the example given in Section 5.2 is only one example from the large interaction class denoted by called party number (M–!M).

6. Creation of Service Access Tables

This has two aspects: identification of suitable data items; specifying the preconditions and access types for each service and for each data item.

A basic set of candidate data items is given in FIG. 13. These were selected by inspecting the service specifications, including standardised information flows. It is visualised that a more realistic list would have between fifty and a hundred items. Items which are only used by a single service or are implementation dependent should be avoided.

In FIG. 13 the first group of items relate to call setup. The called party number is assumed to be equivalent to the dialled digits. Services which translate the dialled digits create a translated number item. Call diversion or rerouting is not considered to be digit translation. The calling party number is sometimes referred to as the calling line id. After an unsuccessful call setup attempt, a number of services create an automatic dialled number, so that another attempt can be made later.

The PIN item is created by services which require the caller to enter a Personal Identification Number. For simplicity a single PIN item is shown, although it is possible that more than one PIN may be required to satisfy all the services.

The next group of items relate to charging. By default the caller is charged for the call. Services exist which charge to a specified account or to a credit card and these create account code or credit card number respectively. Freephone type services charge the called party and create charge called party. Other services split the charges and create charge both parties.

The final group relate to resource contention. This subject is considered in the next section.

An example set of preconditions and access types is given in FIG. 14 and for completeness FIG. 15 gives a list of service abbreviations. FIG. 14 is used for illustrative purposes and is not meant to be definitive. It can also be used to test the computer software. It is assumed that the calling party number is not modified when a call is diverted, although this may not always be true. Some services consist of several parts (the part number is preceded by underscore), e.g. Call Back when Free. If CBWF_1 detects a busy state during call setup, it will create automatic dialled number. When the called party becomes free, CBWF_2 will restart call setup, providing the calling party remains free.

7. Extensions to the Basic Algorithm

The algorithm described in Section 4 above reads a sequence of specified services, without checking that the ordering is valid. If each service is given a unique decimal order number, then the correct ordering can be established.

If the start and end DPs of a service differ, it is possible to generate a list of DPs which are masked by the service. It will not be possible to gain access to a service whose start DP is in this list. This is a control type service interaction. Such inaccessible services need not be included in tests for precondition or access type conflicts.

Another type of conflict arises when there is contention for limited physical or logical resources. For example, a user may not be permitted to use more than one bridge. This conflict can be detected by introducing an additional consume access type. The first service to require a bridge consumes bridge resource. Subsequent services which require a bridge also attempt to consume bridge resource and thus give a multiple consume conflict. In the more general case, a user may be permitted to use several instances of a resource. Contention still arises however, if the number of instances required exceeds the maximum number permitted.

8. Software

Two software programs are described as examples of those that may be used to carry out the Service Interaction Checking; servab and sicheck. The servab program allows Service Abstract files to be created interactively and the sicheck program allows a number of Services, defined by their Service Abstract files, to be checked for interactions. The interaction checking in sicheck uses two algorithms:

a control-based approach using the Detection Points (DPs) involved in Services, and a data-based approach using database style access definitions, also capable of identifying some resource conflicts.

In applications, such as for System X call processing software, where the abstract information is difficult to obtain automatically, both servab and sicheck will be required. System X is a stored-program control telephone exchange system initially installed in the United Kingdom. In Intelligent Network (IN) applications it is likely that a system will be developed to extract Service Abstracts from the data produced by a Service Creation Environment (SCE). The use of servab may be seen as a stop-gap measure to enable early use of the interaction checking embodied in sicheck.

These two programs are described below; Sections 9 and 10 discuss the user-interface of the servab program, Sections 11, 12, 13, 14 and 15 discuss the user-interface of the sicheck program and Section 16 describes the software for both programs.

9. Overview of the servab program

The servab program allows Service Abstract files to be created interactively. The main window for this program is shown in FIG. 2. Each Abstract has the following elements:

Service Identifier

This is the acronym of the Service. It is used to identify the Service when it is involved in interactions in the sicheck program. It is also used to form the name of the Abstract file. This field is compulsory.

Service Name

This is the descriptive name of the Service. If this is not specified by the user, it defaults to the Service Identifier.

BCSM Type

This is selected from a pop-up menu. The choices, currently, are Q.1214 CS-1, Q.1204 CS-N and System X.

Start DP

A Start DP must be specified.

Position Number

This is a positive integer and the field is compulsory. The precedence of a Service is defined by the combination of Start DP and Position Number, c.f., the order of segments in the call chain in the segmented call model. The Position Number and Start DP are used by the sicheck program to order Services which are to be checked for interactions.

End DP(s)

There can be any number of End DPs but there must be at least one.

Conflict DPs

This is a list of DPs which conflict with the Service being described. In the sicheck program, any subsequent Service whose Start DP is one of these Conflict DPs will produce a Control Conflict interaction. This list is generated automatically by the program when the BCSM Type is altered or the Start DP or End DP(s) fields are left.

A list of Entries

An entry consists of a data item and a Precondition or an Access type. Any number of entries can be specified and the list given should completely describe the preconditions and actions of the Service. Each Entry is added using the Add window shown in FIG. 3. There is a standard list of information items available which is shown in FIG. 3.

The user can add new information items to this list from the menu shown and can load and save files of information items (see Section 10). The available Access types and Preconditions are also shown in FIG. 3.

10. Options in the servab program

The menu at the bottom of the main window of the servab program has four options which allow the user the Load and Save Service Abstract files and Data Items files, Clear all the data specified in the main window and Quit the program.

Load—Abstract

This option displays a File Selection Window which allows the user to traverse the directory structure and select a Service Abstract file to be loaded. When a file is loaded successfully, the information from the file is displayed in the main window. If the user has changed any of the information concerning the current Abstract since it was last saved, the user is warned of this and given the option to save or abort the Load before a new file can be selected. All Service Abstract files have the extension ".abs".

Load—Information

This option displays a File Selection Window which allows the user to traverse the directory structure and select a Data Items file to be loaded. When a file is loaded successfully, the data items from the file are used to form the menu of data items shown in FIG. 3. If the user has added any new data items since the data items were last saved, the user is warned of this and given the option to save or abort the Load before a new file can be selected. All Data Items files have the extension ".inf".

Save—Abstract

This option checks all the data entered in the main window and, if this is found to be acceptable, saves the current Service Abstract in a file called Service Identifier.abs in the current working directory. If the file already exists it is automatically overwritten.

Save—Information

This option displays a File Selection Window which allows the user to traverse the directory structure and name a Data Items file to which the current list of data items (i.e. those in the current Data Items menu) is to be saved. All Data Items files have the extension ".inf".

Clear

This option clears all the data in the fields in the main window. If the user has changed any of the information concerning the current Abstract since it was last saved, the user is warned of this and given the option to save or abort the Clear before the data is cleared.

Quit

This option exits the program. If the user has changed any of the information concerning the current Abstract or added any new Data Items since they were last saved, the user is warned of this and given the option to save or abort the Quit before the quit is executed.

11. Overview of the sicheck program

The sicheck program checks for interactions between Services. It will check for interactions between any number of Services or between a single Service and a Library of Services. Any Interactions or Control Conflicts found are displayed and the user is allowed to "weed-out" unwanted Interactions explicitly and/or via a set of Exclusion Rules. The main window for this program is shown in FIG. 4. The first mode, of checking between a set of Services could be applied when about to release a new portfolio of Services. The second mode, checking between a single Service and a set of existing Services, is the more frequently used option in Service creation and would typically be run after defining a new Service but before proceeding to implementation and deployment of the new Service.

12. The Input options in the sicheck program

The Input option in the top-level menu of the sicheck program has three options in its associated pull-down menu:

12.1 Service List

Figure 5A:
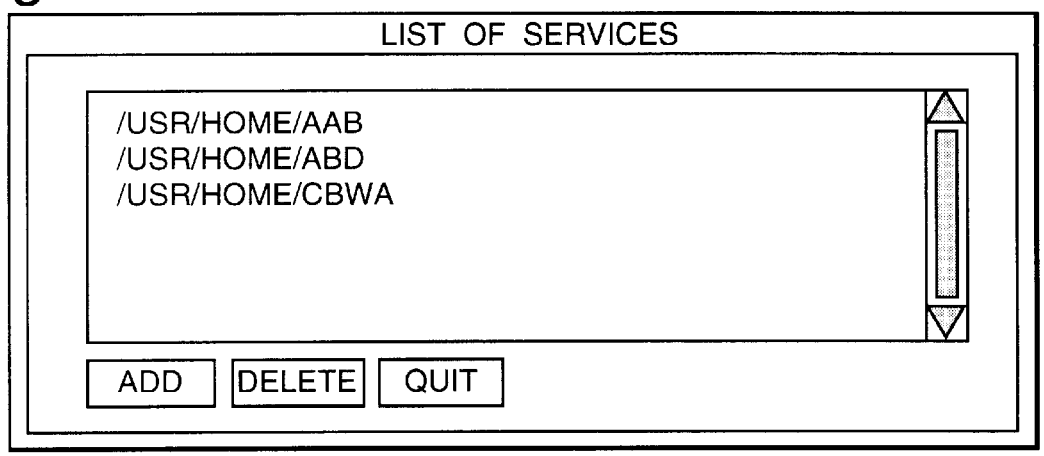
FIGS. 5a and 5b show alternative versions of the List of Services window.
Figure 5B:
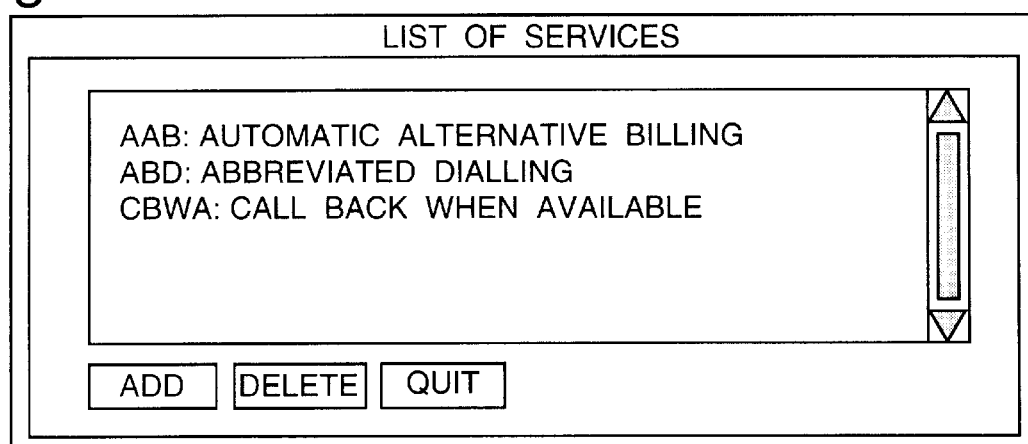

This option displays a window containing the current list of Services (see FIGS. 5*a* and 5*b*). The Services in the list are always ordered alphabetically by Service Identifier but can be displayed either as the full pathname of the Service Abstract file FIG. 5*a* or as Service Identifier followed by Service Name FIG. 5*b* (see also Section 13.1). Services can be added to the list via the Add option and removed from the list via the Delete option (a Service can also be removed by double-clicking the mouse on it). The Add option displays a File Selection window which allows the user to traverse the directory structure and select a Service Abstract file.

12.2 Library List

Figure 6:
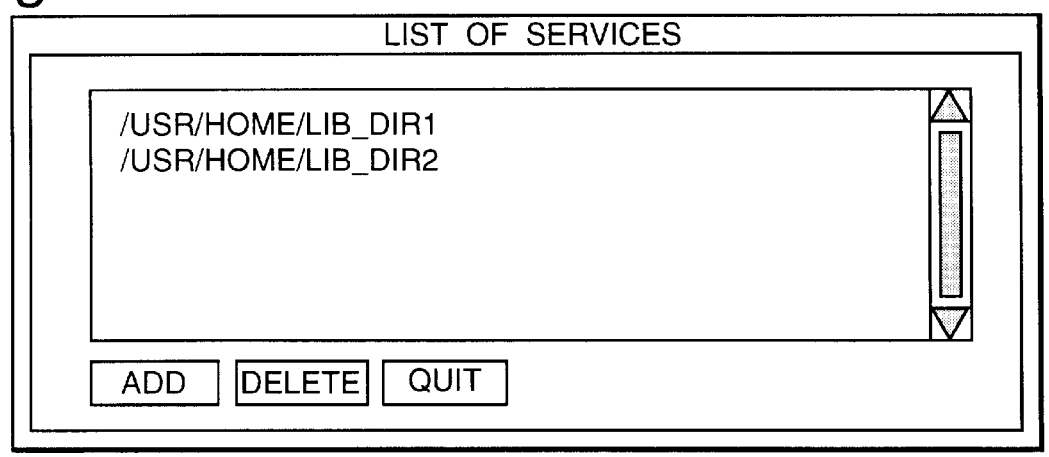
FIG. 6 shows the List of Libraries window.

This option displays a window containing the current list of Libraries (see FIG. 6). A Library is a directory containing a number of Service Abstract files. The Libraries in the list are always ordered alphabetically. Libraries can be added to the list via the Add option and removed from the list via the Delete option (a Library can also be removed by double-clicking the mouse on it). The Add option displays a File Selection window which allows the user to traverse the directory structure and select a directory containing Service Abstract files.

12.3 Read rules

This option allows the user to load a previously created file of Exclusion Rules (see Section 15.2). It displays a File Selection window which allows the user to traverse the directory structure and select a Rules file for loading. All Rules files have the extension ".rul".

13. The Options options in the sicheck program

The Options option in the top-level menu of the sicheck program has two options in its associated pull-down menu, each of which has two sub-options:

13.1 Service List

This option controls the way in which the Services are displayed in the List of Services (see FIG. 5 and Section 12.1). The user can choose to display the full pathname of each of the Service Abstract files (sub-option Display files) or display the Service Identifier followed by Service Name for each Service (sub-option Display names).

13.2 Interactions List

Figure 7:
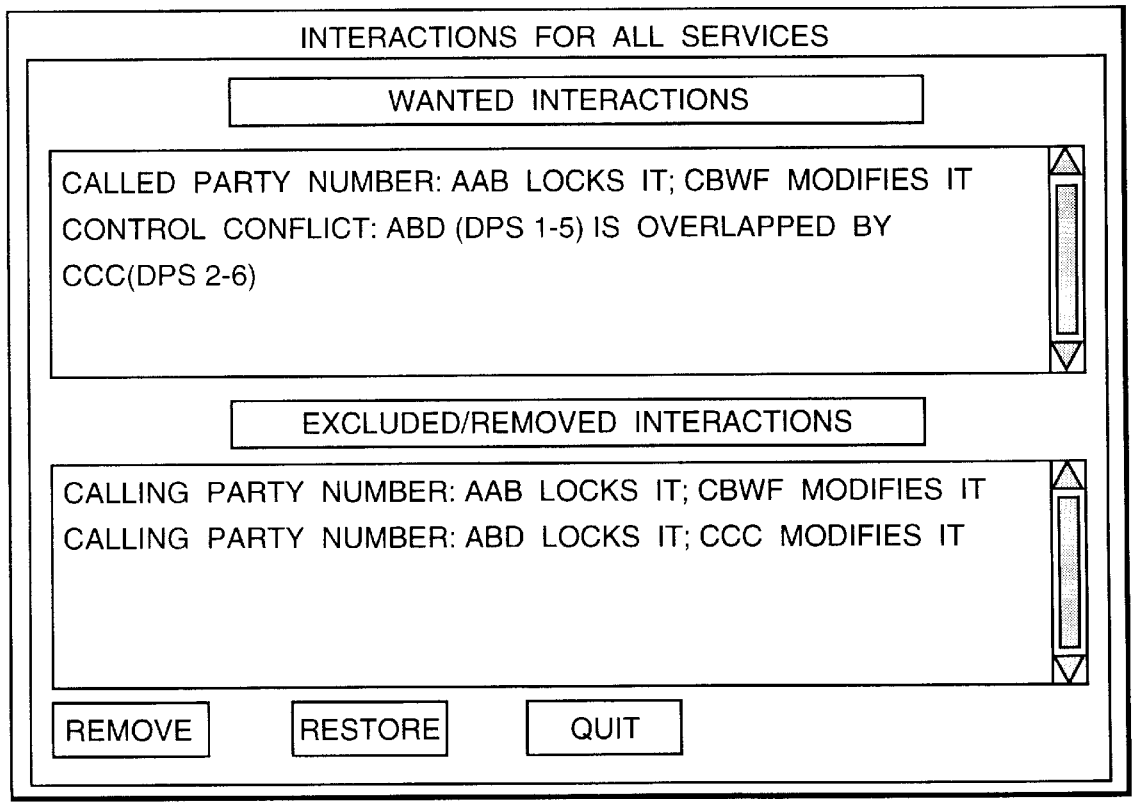
FIG. 7 shows the List of Interactions window.

This option controls the way in which the Interactions are ordered and displayed in the List of Interactions (see FIG. 7 and Section 15.1). The user can choose to order the Interactions alphabetically by Data Item (sub-option Order by service). If the Interactions are order by Data Item, the Data Item appears first in each reported Interaction. If the Interactions are ordered by first Service, the Service Identifier appears first and Interactions are ordered by Data Item within each first Service.

14. The Checks option in the sicheck program

The Checks option in the top-level menu of the sicheck program has two options in its associated pull-down menu:

14.1 Service

The Service option initiates a check for interactions between all of the Services currently in the Service List (see Section 12.1). The Services are checked in the order specified by their Start DPs and Position Numbers. If any interactions are found, the List of Interactions is displayed (see FIG. 7).

14.2 Library

The Library option initiates a check for interactions between the currently selected Service in the Service list and all Services in the currently selected Library in the Library list (see Sections 12.1 and 12.2). Services are checked in the order specified by their Start DPs and Position Numbers. Services and Libraries can be selected from the Service and Library list. If any interactions are found, the List of Interactions is displayed (see FIG. 7).

15. The Interactions option in the sicheck program

The Interactions option in the top-level menu of the sicheck program has five options in its associated pull-down menu:

15.1 Display interactions

The sicheck program checks for two types of interaction: any Control Conflict and any interactions concerning the Preconditions and Access Types associated with the Service Data Items (see Section 9). When a successful Service or Library check has been completed and interactions have been found, the List of Interactions is displayed (see FIG. 7). The Interactions are ordered so that Access Type Interactions always appear before Control Conflicts. Access Type Interactions are ordered either by Data Item or by first Service followed by Data Item within each first Service (see Section 6.2). Control conflicts are always ordered by first Service. The form of each Control Conflict and Access Type Interaction (when ordered by Data Item) is shown in FIG. 7. When Access Type Interactions are ordered by first Service, each Interaction in the list takes the following form:

<Service_1> <Access type> <Information Item> <Service_2> <Access type>

The List of Interactions actually consists of two lists; the list of Wanted Interactions and the list of Excluded/Removed Interactions. Interactions can be removed from the Wanted list (and thus placed in the Excluded/Removed list) either via the Remove option or by double-clicking on the appropriate interaction. Interactions can be restored to the Wanted list (and thus removed from the Excluded/Removed list) either via the Restore option or by double-clicking on the appropriate Interaction. The user is also allowed to specify any number of Exclusion Rules which are used to force Interactions from the Wanted list to the Excluded/Removed list (see Section 15.2). Note that Excluded Interactions cannot be Restored and that Removed Interactions cannot be Excluded.

15.2 Edit exclusion rules

Interactions can be excluded from the list of Wanted Interactions (see Section 15.1) via Exclusion Rules. The Edit exclusion rules option outputs a window of the form shown in FIG. 8. Each Rule in this list identifies Interactions associated with a particular Data Item. This can be further refined to identify particular Preconditions and Access Types for both the first and second Services involved in the Interaction.

The Add option allows the user to add a new Rule via a window of the form shown in FIG. 9. The Data Item field is selected from a menu constructed from the available Data Items and the Access Types (or Preconditions) are selected from a menu similar to that shown in FIG. 3. The Edit option allows the user to edit the currently selected Exclusion Rule (also achieved by double-clicking on the appropriate Exclusion Rule) and the Delete option deletes the currently selected Rule from the list.

15.3 Apply exclusion rules

This option simply applies all of the specified Exclusion Rules to the complete list of Interactions. Note that Interactions which have been explicitly Removed from the Wanted list of Interactions will not be affected by the Exclusion Rules.

15.4 Save rules

This option delays a File Selection Window which allows the user to traverse the directory structure and name a Rules file to which the current list of Exclusion Rules is to be saved. All Rules files have the extension ".rul".

16. The software

The software for the servab and sicheck programs has some common data structures, global data and functions.

16.1. The include files comdefs.h—#defines common to both programs comtypes.h—structure type definitions common to both programs comfunc.h—declarations of functions common to both programs comglob.h—declarations of global data common to both programs abstypes.h—structure type definitions for servab absfunc.h—declarations of functions for servab absglob.h—declarations of global data for servab sicdefs.h—#defines for sicheck sicfunc.h—declarations of functions for sicheck sicglob.h—declarations of global data for sicheck sictypes.h—structure definitions for sicheck 16.2 The source files 16.2.1 Common comcode.c—Functions concerned with reading a Service Abstract from file, adding entries of Data Item and Access Type to a list of entries, freeing common data and converting Access Type strings to Access Type values strfuns.c—Functions to manipulate and maintain alphabetically ordered, dynamically created lists of strings (STRLIST structures)

16.2.2 Servab abstract.c—Main function for the servab program abinits.c—Initialisation functions for the Motif widgets, the global data and the initial list of data items bcsm.c—Functions concerned with reading the BCSM data files into memory and calculating the list of Conflict DPs from a given Start DP and End DP(s)

entries.c—Functions which create and control the Mofit widgets concerned with adding and editing entries of Data Items and Access Types for a Service Abstract filing.c—Functions concerned with the reading and writing of Service Abstract files and Data Items files items.c—Functions which create and control the Motif widgets concerned with adding a new Data Item to the menu of Data Items listfuns.c—Functions concerned with the removal of entries from a list of entries and the creation of the entries string mquest.c—Functions which create and control the Motif widgets concerned with the prompting of the user for clearing, re-loading or quitting when data has changed since the last save toplevel.c—Functions which create and control the Motif widgets concerned with the main servab program window 16.2.3 sicheck sicheck—Main function for the sicheck program dochecks.c—Functions which control the reading and creation of all the data necessary to carry out the Service or Service-Library Interaction Checking interacts.c—Functions which actually carry out an Interaction check on two services and construct and manipulate the list of Interactions rules.c—Functions which create, maintain, read and write the list of Exclusion Rules sicfree.c—Functions which free the various global data items sicinput.c—Functions which create and maintain the list of Services and list of Libraries sicints.c—Functions which create and control the widgets concerned with the display of the list of Interactions sicllist.c—Functions which create and control the widgets concerned with the list of Libraries sicmenu.c—Functions which create and control the main widget/menu of the sicheck program sicrules.c—Functions which create and control the widgets concerned with the list of Exclusion Rules sicslist.c—Functions which create and control the widgets concerned with the list of Services 16.3 The data structures In the following section, a list denotes a structure which has three members: an array of pointers and two integers. The array of pointers is dynamically created (i.e., space allocated to the array is increased whenever necessary), the first integer stores the number of pointers currently in the array and the second integer stores the maximum number of pointers which can be entered in the array (i.e., the space allocated to the array must be increased when the first integer equals the second integer).

ACCESS: an Access Type and is associated identification/description string.

ENTRY: a Data Item string and an Access Type.

INFOLIST: all the information required to describe a Service Abstract: Service Identifier, Service Name, BCSM Type, Position Number, Start DP, number of End DPs and an array of End DPs, number of Conflict DPs and an array of Conflict DPs and an INFOLIST.

STRLIST: a list of strings.

BCSMINFO: a BCSM identification string and its associated file name.

CDPINFO: an array of Control DPs associated with a Start DP and a flat to indicate whether the Start DP is valid or not.

REDACC: a Data Item string and an array of integers to indicate the Access Types associated with the Data Item for a particular Service.

REDACCLIST: a list of REDACC structures.

SERVENT: a Service Identifier, a Service Name and the name of the associated full filename for a particular Service.

SERVLIST: a list of SERVENT structures.

SERVICE: very similar to the ABSTRACT structure except that it does not contain the Service Name and it contains a list of 'reduced' Data Item/Access Type information (REDACCLIST) instead of a full list of entries (INFOLIST).

SABSLIST: a list of SERVICE structures.

ACCESS_INFO: a Data Item string and two Access Types used to store the information associated with an Access Type Interaction.

DP_INFO: two Start DPs used to store the information associated with a DP Control Conflict Interaction.

INTERACTION: an Interaction Type (either Access Type of Control Conflict), a status (WANTED, EXCLUDED or REMOVED), the Identifiers of the two interacting Services, the specific information associated with the Interaction and the string which describes the Interaction to the user. The specific information associated with the Interaction is included as a Union of an ACCESS_INFO and a DP_INFO.

INTERLIST: a list of INTERACTION structures with two extra members; two integers to store the number of Access Type Interactions and the number of Conflict Control Interactions currently in the list.

INTRULE: a Data Item string, the Access Types associated with the two Interacting Services and the string which describes the Exclusion Rule to the user.

RULELIST: a list of INTRULE structures.

16.4 The global data 16.4.1 Common

All global data common to the two programs is defined in comcode.c accstrs—An array of NUMACC ACCESS structures which stores the list of Access Types currently available in the two programs bcsminfo—An array of NUMBCSM BCSMINFO structures which stores the BCSM types currently available 16.4.2 Servab All global data for the servab program is defined in abstract.c abstract—An ABSTRACT structure which stores all the information associated with the current Service itemlist—A STRLIST structure which stores the current list of Data Items available in the program bcsmdps—An array of MAXDP+1 CDPINFO structures which stores the BCSM Control DP information read from the appropriate BCSM file abschngd—A flag to indicate whether any of the Service Abstract information has been altered since it was last saved to file infchngd—A flag to indicate whether any Data Items have been added to the list by the user since it was last saved to file 16.4.3 Sicheck All global data for the sicheck program is defined in sicheck.c services—A SERVLIST structure which stores the list of Services entered by the user libraries—A STRLIST structure which stores the list of Libraries entered by the user infoitems—A STRLIST structure which stores the list of Data Items from which the user can choose when defining Exclusion Rules interactions—A INTERLIST structure which stores the current list of Interactions generated by the program rules—A RULELIST structure which stores the current list of Exclusion Rules entered by the user servabs—A SABSLIST structure which stores the list of Service Abstracts which are to be checked for Interactions SIC_checktype—A flag which indicates the type of Interaction check carried out (a check of all Services in the List of Services or a check of a single Service against a Library of Services)

SIC_servlst_type—A flag which indicates the type of List of Services display currently being used (display of file names or Service Names)

SIC_intlst_type—A flag which indicates the type of Interaction ordering currently being used (order by Data Item or by first Service)

16.5 Algorithm for calculating the list of Conflict DPs

The list of Conflict DPs is calculated from the information contained in the appropriate BCSM file and the Start and End DP(s) of the Service. Each BCSM file has a number of comment lines (each beginning with '(') followed by a line for each valid Start DP for the BCSM. Each line of DP information contains the Start DP followed by a list of successor DPs. The appropriate BCSM file is read into the bcsmdps array when the program is loaded, an Abstract file is loaded and when the user changes the BCSM type of the Service. Each element in the bcsmdps array contains an array of integers and a validity flag. Each array of integers is initialised to zero and each validity flag is initialised to FALSE before a new BCSM file is read. The validity flag is set to TRUE if the appropriate Start DP is read from the file and the successor DPs read are placed in the array of integers, beginning at index 0. Note that the bcsmdps array is indexed directly by Start DP so that the zeroth element of the array is never used.

The code for the calculation of the Conflict DPs has the following steps:

Initialise array of integers (dps_following_startdp) to zero.

Starting at the start DP of the Service, follow each possible successor DP using the bcsmdps array, setting the nth element of the dps_following_startdp for each DP number, n, that is reached, to a value '1', stopping when all successor DPs have already been set to '1'.

Initialise another array of integers (controlled_dps) to zero.

For each End DP of the Service:
  Move onto the next End DP if this End DP is equal to the Start DP.
  Copy the dpsfollowing_startdps array into a new array, controlled_by_this_range.
  Starting at the given End DP, follow each possible successor DP using the bcsmdps array, setting the nth element of controlled_by_this_range for each DP number, n, that is reached, to a value '0', stopping when all successor DPs have already been set to '0'.
  OR controlled_dps with controlled_by_this_range and put the result in controlled_dps.

Transfer the information contained in controlled_dps to the array of Conflict DPs in the ABSTRACT structure (i.e., put the DP 'n' in the ccdp array if the nth element of controlled_dps is set to '1').

16.6 Algorithm for checking for Interactions

For each Service which is involved in the Interaction check, the Service Abstract file is read and a SERVICE structure is created. Each SERVICE structure contains a list of reduced access information. For example, consider a Service with the following Data Item/Access Type entries:

Not modified: Called Party Number

Lock: Called Party Number

Create: PIN

Not Created: Automatic Dialled Number

Each of these is stored as an ENTRY structure within the ABSTRACT structure. These four ENTRYs are converted into three REDACC structures; one for each Data Item. The array of integers associated with each Data Item stores the Access Type information—a '1' for a used Access Type and a '0' for an Access Type which is not used. The order of these integers is assumed to be: NOTCREATED, NOTMODIFIED, CREATE, READ, MODIFY, LOCK, HIDE, CONSUME.

Each SERVICE structure is added to the list of Service Abstracts, servabs. This list is ordered by increasing Start DP, and for each Start DP, it is ordered by increasing Position Number. Once this list is complete, the Interaction Checking is carried out. If the program has been asked to do an Interaction Check between all Services, the following loop structure is used:

```
For (each Service_i)
    For (each Service_j, j greater than i)
        Check_for_interactions: Service_i followed by Service_j
    End For
End For
```

If the program has been asked to do an Interaction Check between a single Service and a Library of Services, the following loop structure is used:

```
For (each Service_i)
    If (Service_i == Service_to_be_checked)
        Continue to next Service
    End If
    If (Service_i is earlier in the list than Service_to_be_checked)
        Check_for_interactions:
        Service_i followed by Service_to_be_checked
    Else
        Check_for_interactions:
        Service_to_be_checked followed by Service_i
    End If
End For
```

The function which actually checks for Interactions between two given Services checks first for Access Type Interactions and then for Control Conflict Interactions. For the Access Type Interactions, it contains a conflict table. This is simply a matrix of integer flags; the order of the flags of both the rows and the columns is the same as that for the array of Access Type integers in the REDACC structure. The value of the flag is either TRUE (an Interaction occurs) or FALSE (an Interaction does not occur). The Access Type Interaction checking code has the following structure:

```
For (each of the Data Items, i, accessed by the first Service)
    If (the Data Item is not accessed by the second Service)
        Continue to next DataItem
    End If
    For (each element_j in the REDACC array, i, in the first Service)
        If (element is zero)
            Continue to next element
        Endif
        For (each element_k in corresponding REDACC array in second Service)
            If (element is zero)
                Continue to next element
            End If
            Get flag from conflict matrix element (j,k)
            If (flag is TRUE)
                Create new Interaction and add to list of Interactions
            End If
        End For
    End For
End For
```

The Control Conflict Interaction checking code simply checks the Start DP of the second Service against the array of conflict DPs (ccdp) for the first Service. If the Start DP appears in the ccdp array, an Interaction is created and added to the list of Interactions.

16.7 Library functions

There are a number of functions used within the program which normally are part of local libraries (e.g., functions which output an error message in a window to which the user must respond, read data of various types from TextField Widgets and create an control File Selection Widgets). All functions used within the programs which are not part of the standard libraries and are not defined in any of the files listed earlier in this Section would normally be defined in these libraries.

What we claim is:

1. A method of detecting interactions between services in a set of services in a telecommunications system, comprising the step of: producing a service abstract based on a Basic Call State Model (BCSM) which gives a high level description of a Call Processing Subsystem and a data processing sequence performed by basic call processing and by the services in respect of a global data item.

2. The method as claimed in claim 1, wherein an additional service processing sequence is performed by the data processing sequence leaving the BCSM at a start detection point (DP), and the step of rejoining the BCSM at an end DP when the additional service processing sequence is complete.

3. The method as claimed in claim 2, wherein the producing step is performed by providing the service abstract with a position number to provide an order of priority for the services having the same start DP.

4. The method as claimed in claim 2, wherein the producing step is performed by providing the service abstract with service preconditions and service access types for the global data item.

5. The method as claimed in claim 1, wherein the producing step is performed by generating the service abstract from an output of a Service Creation Environment.

* * * * *